May 24, 1932.　　　G. H. COOK　　　1,860,017

GEAR TRANSMISSION

Filed Feb. 26, 1931　　　2 Sheets-Sheet 1

Inventor
George H. Cook,

By Fetherstonhaugh & Co.

Attorney

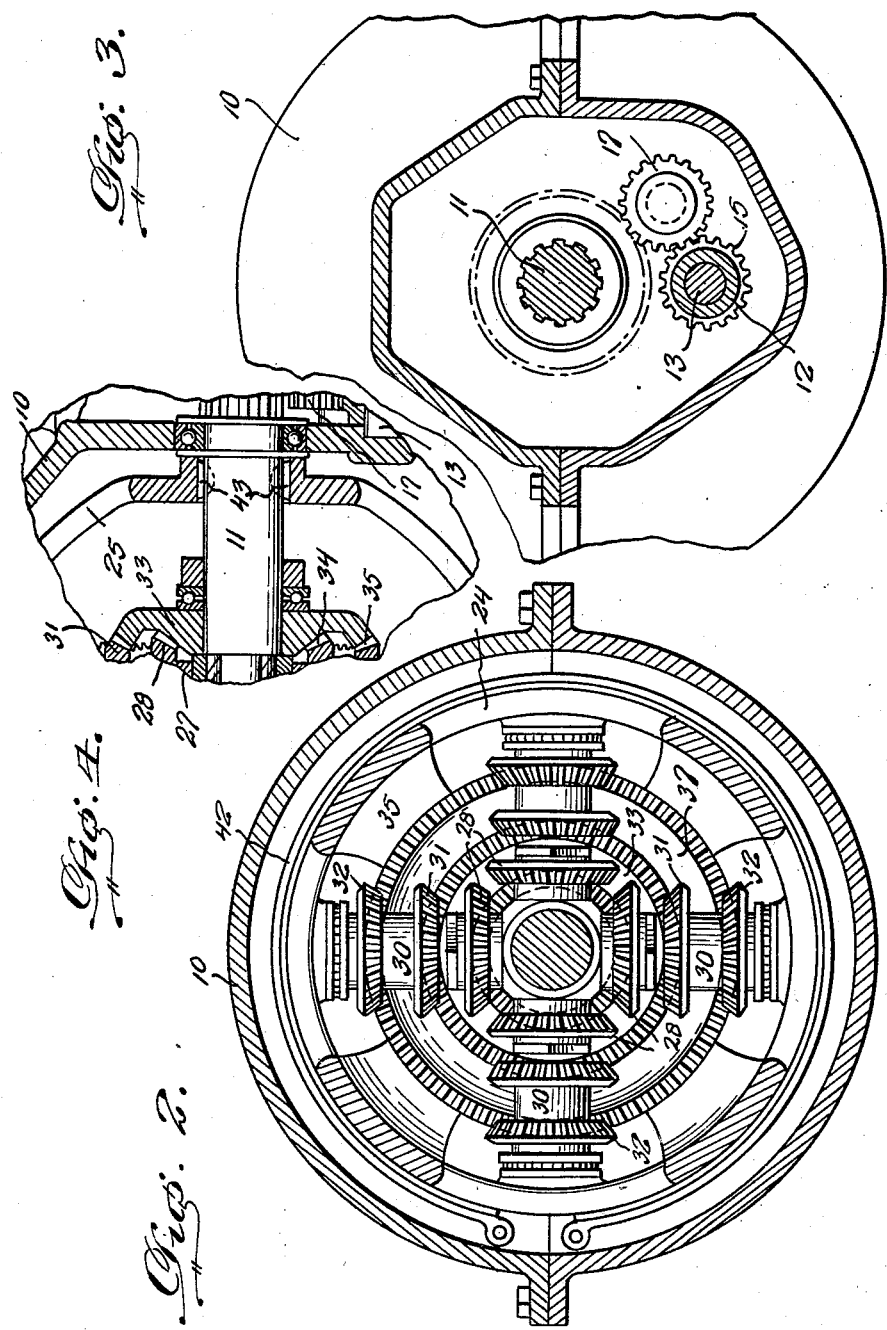
May 24, 1932.  G. H. COOK  1,860,017
GEAR TRANSMISSION
Filed Feb. 26, 1931  2 Sheets-Sheet 2
Inventor
George H. Cook,
Attorney Patented May 24, 1932

1,860,017

UNITED STATES PATENT OFFICE

GEORGE H. COOK, OF SANTA BARBARA, CALIFORNIA

GEAR TRANSMISSION

Application filed February 26, 1931. Serial No. 518,539.

The present invention comprehends the provision of a shiftless automatic bevel gear transmission mechanism.

In carrying out my invention, I comprehend a transmission mechanism of the above mentioned character, wherein use of the clutch is only necessary when starting and stopping and the necessity of shifting gears eliminated under any and all conditions, except to obtain a neutral position.

In accordance with the present invention, the mechanism has but one neutral position, obtained by use of a single sliding gear, and said mechanism normally when at rest is in direct driving relation with the drive shaft.

It is an object of the present invention to provide a shiftless automatic transmission mechanism, wherein a predetermined maximum resistance of the driven shaft is capable of being pulled by a direct drive through the proper gear ratio of the mechanism, while any greater amount of resistance offered by the driven shaft is automatically compensated by the relative rotation of the gears of different ratio.

More specifically stated, the transmission mechanism is associated with both the drive and driven shafts by gears of proper ratio, so that as long as the driven shaft offers no more than a predetermined maximum resistance, the mechanism rotates as a single unit with no gears moving in mesh. However, when more than said predetermined maximum resistance is offered by the driven shaft, certain gears of the mechanism are caused to rotate relatively slower than the speed of rotation of the drive shaft, until the excessive resistance of the driven shaft has been eliminated.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 2 is a sectional view on line 2—2 of Figure 1.

Figure 3 is a sectional view on line 3—3 of Figure 1.

Figure 4 is a fragmentary sectional view of a slightly modified construction.

Figure 1:
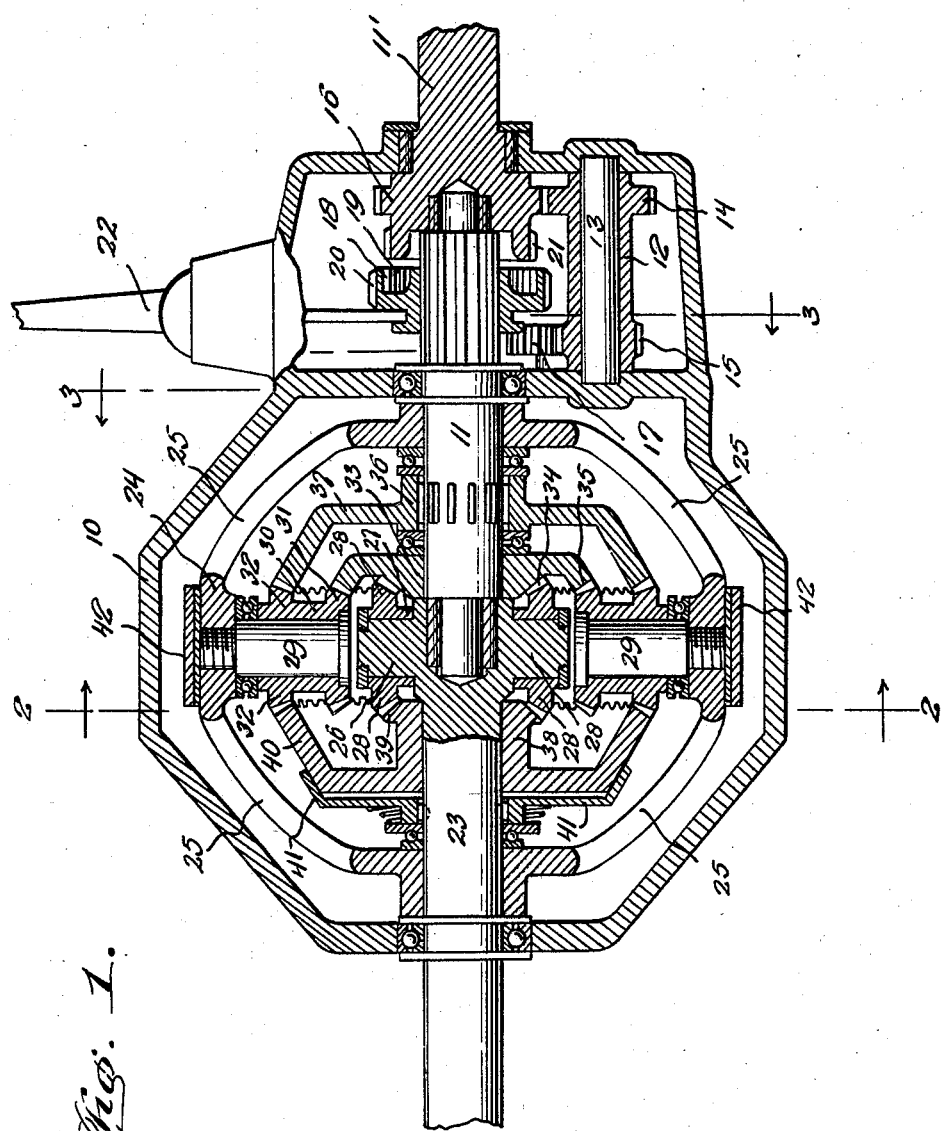
Figure 1 is a vertical sectional view showing the mechanism forming the subject matter of the present invention.

Before entering into a detail description of what is herein shown, I desire to have it understood that the essence of the invention resides in the provision of a shiftless automatically operable transmission mechanism, and the invention comprehends all structures embodied in the scope of the appended claims.

Referring to the drawings, and more particularly to Figures 1 to 3 inclusive, 10 indicates the transmission case, in which the mechanism is arranged. The drive shaft 11 has associated therewith a conventional type of sliding gear transmission, including a hollow shaft 12 rotatably mounted upon the fixed shaft 13. The shaft 12 is provided with gears 14 and 15 respectively, the former meshing with the gear 16 carried by the motor shaft 11′, which is suitably coupled with and forms part of the drive shaft 11. The gear 15 of the hollow shaft 12 meshes with a reverse gear 17. Slidably mounted on the drive shaft 11 and splined thereto is a gear 18 having internal and external teeth 19 and 20 respectively. The teeth 19 are adapted to mesh with the gear 21 carried by the motor shaft 11′, while the external teeth 20 are adapted to mesh with the reverse gear 17 when use of the latter is desired.

The sliding gear 18 is controlled by the usual shift lever 22.

The mechanism forming the subject matter of the present invention provides a connection between the drive shaft 11 and the driven shaft 23, and includes gears of proper ratio, so that a predetermined maximum resistance of the driven shaft 23 can be pulled by a direct drive. Any greater amount of resistance offered by the driven shaft is duly taken care of under any and all conditions. In the embodiment of the invention disclosed in Figures 1 to 3 inclusive, the mechanism includes a yoke having a ring-like portion 24 supported between arms 25 which are mounted upon the drive shaft 11 and the driven shaft 23. Carried by the inner end of the driven shaft 23 is a plurality of radially disposed spider arms 26, which of course may vary in number without departing from the spirit of the invention. Each of these arms rotatably support a hub 27 equipped with a bevel gear 28. Supported by and projecting inwardly from the ring-like portion 24 of the yoke are spider arms 29, disposed in alignment with the spider arms 26 and corresponding in number thereto. Rotatably mounted on each spider arm 29 is a hub 30 equipped with spaced gears 31 and 32 respectively.

Mounted for rotation on the drive shaft 11 is a hub 33 equipped with spaced concentrically disposed gears 34 and 35 of different ratios, with the gear 34 always in mesh with the gears 28, while the gear 35 is always in mesh with the gears 31 of the hubs 30. Keyed upon the drive shaft 11 is the hub 36 of a gear 37 which is always in mesh with the gears 32 of the hubs 30. Obviously this arrangement of gears provide a connection between the spider arms 26 and 29 respectively on the drive shaft side of the mechanism.

Rotatably mounted on the driven shaft 23 is a hub 38 with two spaced concentrically disposed gears 39 and 40 of relatively different ratios. The gear 39 is always in mesh with the gears 28 of the hubs 27, while the gear 40 is always in mesh with the gears 32 of the hubs 30. Keyed upon the driven shaft 23 and yieldingly influenced in the direction of the gear 40 is a flanged clutch member 41 adapted to frictionally engage the gear 40 to prohibit the gears 39 and 40 of the hub 38 from rotating faster than the driven shaft 23 in the same direction. By reason of the construction hereinabove described, it will be manifest that the mechanism when at rest, is in direct drive, there being no other neutral position than that accomplished by the sliding gear 18. The predetermined maximum resistance desired to be pulled by the direct drive, is accomplished by the proper gear ratio between the gears 31 and 35, and the gears 32 and 37. Consequently as long as the driven shaft offers no more than the predetermined maximum resistance, the entire mechanism revolves as a single unit, with no gears moving in mesh. However, when greater than this predetermined maximum resistance is offered by the driven shaft 23, the gears 39 and 40 start slowing up with respect to the speed of rotation of the drive shaft 11, and increased resistance will cause the hubs 30 with their gears to stop, or even reverse their motion with respect to the drive shaft speed, to a point where the lowest ratio within the mechanism is reached. Of course, as the resistance decreases, the tendency is again to the direct drive.

As there is no piling up of inertia when driven shaft 23 applies power, as occurs when car is descending a hill, a brake element 42 may be employed if desired to hold the yoke stationary at what could be considered an intermediate gear speed. The brake element 42 when employed is associated with the ring-like portion 24 of the yoke, and operated in any ordinary well known manner.

In Figure 4 I have illustrated a modified construction, wherein the yoke is keyed to the drive shaft as at 43, in contradistinction to the structure illustrated in Figure 1. In this embodiment of the invention the gear illustrated at 37 in Figure 1 is eliminated. In this form of the invention the different ratios of gears 32 and 40, and 31 and 35 affords an advantage on one side of the spider arms, providing a ratio between spider arms 26 and 29 according to the number of revolutions gears 35 and 40 revolve in opposite directions. These revolutions are caused by resistance between the spider arms, and not by motor speed, but the faster the speed of rotation of the drive shaft, the faster the gears 35 and 40 must revolve to maintain a given ratio.

It is manifest that the invention provides a transmission mechanism, which entirely eliminates shifting of gears with the resultant difficulties frequently encountered, as well as the objectionable noise incident to the shifting of gears in present day transmission constructions, and that use of a clutch is only necessary in starting or stopping a vehicle equipped with the present invention.

While it is believed that from the foregoing description the nature and advantages of the invention will be readily apparent, such changes in the construction may be resorted to when desired as fall within the scope of what is claimed.

What is claimed is:

1. In combination, a drive shaft, a driven shaft, a shiftless bevel gear transmission mechanism providing a direct drive connection between said shafts and including a plurality of gears of relatively different ratio mounted on each shaft, a ring-like member supported in spaced concentric relation about said gears, rotatably mounted intermediate gears supported by said ring-like member and constantly in mesh with certain of the aforementioned gears, similar intermediate gears rotatably supported by said driven shaft and meshing with other of the first mentioned gears, and a friction clutch member yieldably mounted on the driven shaft and adapted to frictionally engage the gear mounted thereon.

2. In combination, a drive shaft, a driven shaft, a shiftless bevel gear transmission mechanism providing a direct drive connection between said shafts, and including a plurality of spaced concentrically disposed gears mounted on each shaft, a ring-like member supported about said gears, rotatably mounted intermediate gears supported by said ring-like member and constantly in mesh with the adjacent gears on said shafts, similar intermediate gears rotatably supported on said driven shaft and constantly in mesh with the adjacent first mentioned gears, a brake band surrounding the ring-like member, and a clutch member yieldably mounted on the driven shaft and adapted to frictionally engage the gear mounted thereon.

3. In combination, a drive shaft, a driven shaft, a shiftless bevel gear transmission mechanism providing a direct drive connection between said shafts, and including a plurality of spaced concentrically disposed gears mounted on each shaft, a yoke supported by said shafts and including a ring-like member disposed about said gears, rotatably mounted intermediate gears supported by the ring-like member and constantly in mesh with the adjacent gears on said shafts, similar intermediate gears rotatably supported on the driven shaft and constantly in mesh with the adjacent concentric gears of the respective shafts, a friction clutch member yieldably mounted on the driven shaft and adapted to frictionally engage the adjacent gear thereon, and a brake band surrounding said ring-like member.

4. In combination, drive and driven shafts arranged in end to end relation, a shiftless bevel gear transmission mechanism providing a direct drive between said shafts, and including a plurality of gears of relatively different ratio mounted on the respective shafts, a yoke supported by said shafts, rotatably mounted intermediate gears carried by said yoke and in constant mesh with the adjacent gears on said shafts, similar intermediate gears rotatably supported by one end of the driven shaft and in constant mesh with the adjacent gears of the respective shafts, whereby said mechanism rotates as a unit with said shafts against a predetermined maximum resistance of the driven shaft.

5. In combination, drive and driven shafts arranged in end to end relation, a shiftless bevel gear transmission mechanism providing a direct drive between said shafts, and including a plurality of gears of relatively different ratio mounted on each shaft, a yoke supported by said shaft, spider arms carried by said yoke, intermediate gears rotatably mounted on said arms and in constant mesh with the adjacent gears of said shafts, similar arms radiating from one end of the driven shaft, and intermediate gears rotatably mounted on the last mentioned arms and in constant mesh with the adjacent gears of said shafts, whereby said mechanism rotates as a unit with said shafts against a predetermined maximum resistance of said driven shaft.

In testimony whereof I hereunto affix my signature.

GEORGE H. COOK.